United States Patent
Fay et al.

(10) Patent No.: US 10,642,940 B2
(45) Date of Patent: May 5, 2020

(54) CONFIGURABLE ACCESS TO A DOCUMENT'S REVISION HISTORY

(71) Applicant: Microsoft Technology Licensing, LLC, Redmond, WA (US)

(72) Inventors: Jonathan Edgar Fay, Woodinville, WA (US); Robert Earl Standefer, III, Duvall, WA (US); Christopher Lee Mullins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 448 days.

(21) Appl. No.: 15/017,373

(22) Filed: Feb. 5, 2016

(65) Prior Publication Data

US 2017/0228393 A1 Aug. 10, 2017

(51) Int. Cl.
| | | |
|---|---|---|
| *G06F 16/00* | (2019.01) | |
| *G06F 17/30* | (2006.01) | |
| *G06F 21/62* | (2013.01) | |
| *G06F 16/21* | (2019.01) | |
| *G06F 16/23* | (2019.01) | |
| *G06F 16/176* | (2019.01) | |
| *G06F 16/93* | (2019.01) | |
| *G06F 40/166* | (2020.01) | |

(52) U.S. Cl.
CPC ...... *G06F 17/30165* (2013.01); *G06F 16/176* (2019.01); *G06F 16/219* (2019.01); *G06F 16/2329* (2019.01); *G06F 16/93* (2019.01); *G06F 17/30011* (2013.01); *G06F 21/6209* (2013.01); *G06F 40/166* (2020.01)

(58) Field of Classification Search
CPC ............... G06F 17/30165; G06F 17/24; G06F 1/30011; G06F 21/6209; G06F 16/176; G06F 16/93; G06F 40/166; G06F 16/219; G06F 16/2329; G06F 17/30011
USPC .......................................................... 707/608
See application file for complete search history.

(56) References Cited

U.S. PATENT DOCUMENTS

| | | | | |
|---|---|---|---|---|
| 5,581,682 A | | 12/1996 | Anderson et al. | |
| 5,806,078 A | * | 9/1998 | Hug | G06F 17/2288 707/999.202 |
| 5,890,177 A | * | 3/1999 | Moody | G06F 17/24 715/210 |
| 6,189,016 B1 | * | 2/2001 | Cabrera | G06F 17/30067 |
| 6,366,933 B1 | * | 4/2002 | Ball | G06F 16/957 715/203 |
| 7,428,701 B1 | | 9/2008 | Gavin et al. | |

(Continued)

OTHER PUBLICATIONS

"Redact-It—Software Review," Retrieved on: Sep. 18, 2015, Available at: http://www.itqlick.com/redact-it.

(Continued)

*Primary Examiner* — Thanh-Ha Dang
(74) *Attorney, Agent, or Firm* — Michael Best & Friedrich LLP

(57) ABSTRACT

A facility for providing configurable access to a document's history is described. The facility receives input specifying one or more revisions to a document. The facility causes to be stored a representation of at least a portion of the revisions. When the facility receives a request to materialize the document for a particular entity, the facility materializes the document in a manner that includes any of the represented revisions only if the entity is among an authorized class of entities.

15 Claims, 12 Drawing Sheets

(56) References Cited

U.S. PATENT DOCUMENTS

| | | | |
|---|---|---|---|
| 7,536,635 B2 | 5/2009 | Racovolis et al. | |
| 7,802,305 B1 | 9/2010 | Leeds | |
| 7,913,167 B2 | 3/2011 | Cottrille | |
| 8,086,635 B1* | 12/2011 | Rinker | G06F 21/604 707/783 |
| 8,205,150 B2* | 6/2012 | Gelman | G06F 3/0481 715/229 |
| 8,456,654 B2 | 6/2013 | Kelly et al. | |
| 8,584,005 B1 | 11/2013 | Pittenger et al. | |
| 8,694,881 B2* | 4/2014 | Alderucci | G06F 3/0481 715/229 |
| 8,788,711 B2 | 7/2014 | Burkard et al. | |
| 8,856,640 B1* | 10/2014 | Barr | G06F 17/2288 713/158 |
| 10,083,312 B2* | 9/2018 | Moloian | G06F 16/215 |
| 2005/0138540 A1* | 6/2005 | Baltus | G06F 17/2211 715/229 |
| 2007/0260996 A1* | 11/2007 | Jakobson | G06F 17/2288 715/781 |
| 2008/0235289 A1* | 9/2008 | Carnes | G06F 16/986 |
| 2008/0320603 A1* | 12/2008 | Ito | G06F 21/6218 726/28 |
| 2009/0019379 A1* | 1/2009 | Pendergast | G06F 16/93 715/762 |
| 2009/0025063 A1* | 1/2009 | Thomas | G06F 21/6218 726/4 |
| 2009/0259661 A1* | 10/2009 | Cragun | G06F 21/6218 |
| 2010/0039659 A1* | 2/2010 | Suzuki | G06F 21/6218 358/1.14 |
| 2011/0119361 A1 | 5/2011 | Issa et al. | |
| 2012/0110445 A1* | 5/2012 | Greenspan | G06F 17/2288 715/256 |
| 2012/0304304 A1 | 11/2012 | Avrahami et al. | |
| 2013/0326323 A1* | 12/2013 | Siwoff | G06F 17/2288 715/229 |
| 2014/0279843 A1* | 9/2014 | Von Weihe | G06F 17/2288 707/608 |
| 2014/0281873 A1* | 9/2014 | Frew | G06F 17/2288 715/229 |
| 2014/0289207 A1* | 9/2014 | Moloian | G06F 21/6209 707/687 |
| 2014/0372370 A1* | 12/2014 | Massand | G06F 17/30011 707/608 |
| 2015/0379887 A1* | 12/2015 | Becker | G06F 16/93 715/229 |
| 2016/0012082 A1* | 1/2016 | Choudhury | G06F 16/215 707/692 |
| 2016/0055343 A1* | 2/2016 | Coard | G06F 21/31 726/7 |
| 2017/0185573 A1* | 6/2017 | Milvaney | G06F 17/2288 |
| 2017/0220546 A1* | 8/2017 | Codrington | G06F 3/0484 |
| 2018/0124476 A1* | 5/2018 | Nakagawa | G06K 9/4604 |
| 2019/0079912 A1* | 3/2019 | Siwoff | G06F 17/2288 |

OTHER PUBLICATIONS

"RapidRedact—Fast Efficient Redaction Software," Published on: Oct. 9, 2014, Available at: http://www.rapidredact.com/.

"Acrobat Help / Removing Sensitive Content from PDFs," Published on: Oct. 30, 2012, Available at: https://helpx.adobe.com/acrobat/using/removing-sensitive-content-pdfs.html.

"VirtualViewer®—Redact Documents and Images," Published on: Sep. 8, 2013, Available at: http://www.snowbound.com/products/document-viewer/redaction.

"View the Version History of an Item or File in a List or Library", Retrieved from: <<https://support.office.com/en-us/article/View-the-version-history-of-an-item-or-file-in-a-list-or-library-53262060-5092-424D-A50B-C798B0EC32B1>>, Retrieved on: May 24, 2017, 6 pages.

"Wikipedia: User Access Levels", Retrieved from: <<https://en.wikipedia.org/wiki/Wikipedia:User_access_levels>>, Dec. 20, 2015, 6 pages.

Nieiding, Derek., "SharePoint 2010 Officially Released", Retrieved from: <<https://www.razorleaf.com/2010/05/sharepoint-2010-released/>>, May 26, 2010, 7 pages.

"International Search Report and Written Opinion Issued in PCT Application No. PCT/US2017/015697", dated Jun. 2, 2017, 11 Pages. (MS# 358551-WO-PCT).

* cited by examiner document history access permissions table 400

| users | timing | available | event type |
|---|---|---|---|
| @editor | any_time | all_history | |
| *developers, *testers | after_event | event_differences | checkpoint |
| *public | after_event | latest_event | publication |

CONFIGURABLE ACCESS TO A DOCUMENT'S REVISION HISTORY

BACKGROUND

Electronic documents can contain content such as text, images, and spreadsheets, among other types. Electronic documents can be revised over a significant period of time by one or more people. Some document-editing applications—such as certain word processors—track revisions made to the document, storing them in the file that constitutes the document and displaying the full set of them using redlining—underlining formatting for materialized content, and struck-through formatting for deleted content. In some such applications, the author can effectively remove a revision from the history by performing an interaction with the application to "accept" the revision.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for providing configurable access to a document's history is described. The facility receives input specifying one or more revisions to a document. The facility causes to be stored a representation of at least a portion of the revisions. When the facility receives a request to materialize the document for a particular entity, the facility materializes the document in a manner that includes any of the represented revisions only if the entity is among an authorized class of entities.

BRIEF DESCRIPTION OF THE DRAWINGS

FIG. 4 is a table diagram showing sample contents of a document history access permissions table used by the facility in some embodiments to store document history access permissions established for a document.

DETAILED DESCRIPTION

Figure 1:
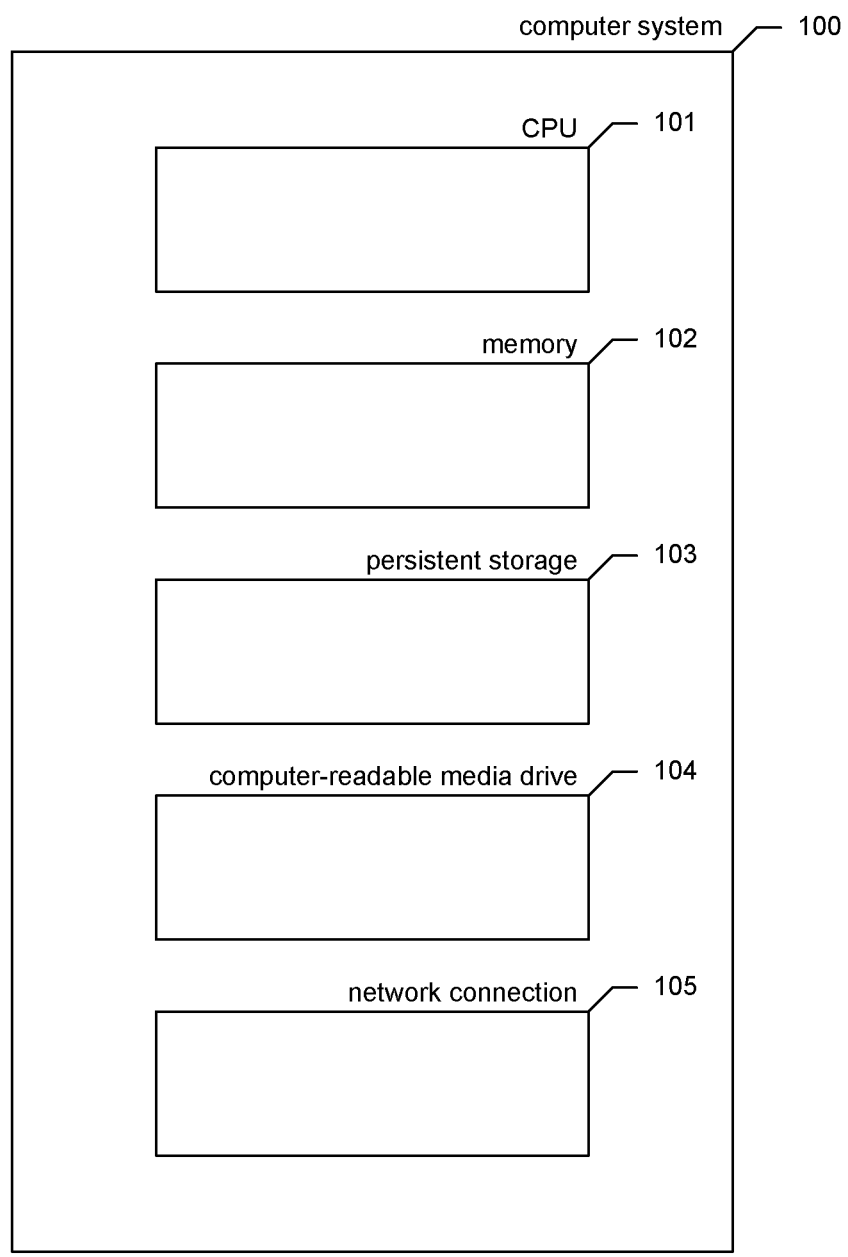
FIG. 1 is a block diagram showing some of the components typically incorporated in at least some of the computer systems and other devices on which the facility operates.

The inventors have recognized that, in many circumstances, it would be useful to be able to provide differential level of access to the document history that is produced by revising a document over its lifetime. For example, in some situations, it can be useful to (1) make the entire history of all of a document's revisions continuously accessible to its author and the author's editor; (2) make a more limited version of the history accessible to others having an intermediate level of relationship with the document; and (3) make little to no history information available to people with no particular relationship to the document.

The inventors have further recognized that providing such differential access to document history information using conventional document history mechanisms would require creating a separate copy of the document for each different level of access; managing manually the ongoing storage of the different document revisions, as well as the association between them; making each revision to the document in every copy of the document; and manually adjusting the aspect of history retained in each document version, such as by accepting more revisions in a first version of the document that is to contain a low level of history information than in a second document version that is to contain a higher level of history information. The inventors have recognized that this process is far too cumbersome to succeed in most organizations.

Accordingly, the inventors have conceived and reduced to practice a software and/or hardware facility for providing to different groups of users differing levels of access to a document's history. Beginning at a document's creation, as it is revised by one or more authors, the facility records a history of these revisions. In various embodiments, the recorded history is a complete history of these revisions, or a less complete history of these revisions, such as a history of these revisions that omits revisions that were later reversed, a history of these revisions that collapses revisions over time, a history of these revisions that omits particularly sensitive revisions, etc. The facility provides a mechanism for use by a document's author(s) and/or other authorized people to specify, for each of one or more groups of users, a level of access that users in the group will have to the history recorded for the document. This level of access is specified by a set of "document history access permissions."

When a particular user seeks to display the document's history, the facility determines a level of access to the document's history to which the user is entitled. The facility proceeds to "materialize" the document and its history—make these available for the user to at least view, and in some cases edit, comment, or otherwise interact with—in a way that permits the user to have the determined level of access to the document's history. For example, for a user entitled to a high level of access to the document's history, such as its author or editor, the facility materializes the document in such a way that the user can view the state of the document at any point in time specified by the user, and/or view the net or gross changes made during any period of time specified by the user. For a user entitled to a medium level of access to the document's history, such as an audience for whom the document is prepared, the facility materializes the document in such a way that the user can view the state of the document only at times when certain document-related events occurred, such as checkpoint events for the document, or publication of events at which the document was published, and/or view the net or gross changes made between a pair of such events selected by the user. For a user entitled to a low level of access to the document's history, such as a user having no particular relationship to the document, the facility materializes the document in such a way that the user can only view the state of the document at the most recently-occurring event of a particular type. In some embodiments, this materialization is performed on one or more computer systems other than the user's computer system, preventing the history information to which the user is not entitled from ever being present on the user's computer system. In some embodiments, the facility also allows each user to select, among the revisions he or she is entitled to see, those that he or she wishes to see.

In some embodiments, levels of access to a document's history can also be differentiated based upon when a user is permitted to access the document's history. For example, for a user entitled to a high level of access to the document's history, the facility may permit the user to access the document's history at any time. For a user entitled to a lesser level of access to the document's history, the facility may permit the user to access the document's history only after the occurrence of an event of a particular type.

In some embodiments, the mechanism provided by the facility for an authorized user to specify a level of access that one or more users will have to document history permits the authorized user to specify this access level for all of the documents in a collection of documents—such as a collection of documents all belonging to a particular portion of an organization, a collection of documents all relating to the same subject, a collection of documents all having the same content classification level, etc.—at one time.

In some embodiments, the facility regulates access to various aspects of a document's history besides its revision history, including its incorporation in other documents over time; comments on or revisions of it over time; its publication history; etc.

In some embodiments, the facility applies document history access permissions established for a user to a computer and/or a computer program accessing document history on behalf of a user, such as a computer and/or a computer program constructing a machine-learning model using the document history or applying it to draw a conclusion or make a prediction, a computer and/or a computer program building a search index using the document history or applying it to conduct a search, to a representation of the document retrieved from a cache, etc.

In some embodiments, the facility provides a mechanism that an authorized user can use to view document history that would be accessible to a particular user or category of users under the established document history access permissions. This process is sometimes referred to as "spoofing" that user or category of users.

In some embodiments, instead of or in addition to operating with respect to the history of entire documents, the facility operates with respect to the history of portions of documents, such as separately-stored document fragments of which documents can be composed.

By performing in some or all of the ways described above, the facility provides a helpful and easy-to-use tool for establishing for a document different levels of access to its history by different users. In some embodiments, the facility further provides a reduction in the level of computing resources needed to perform content classification of documents, such as by removing the need to acquire and operate separate hardware resources for storing documents whose history is the subject of different levels of access by different users.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
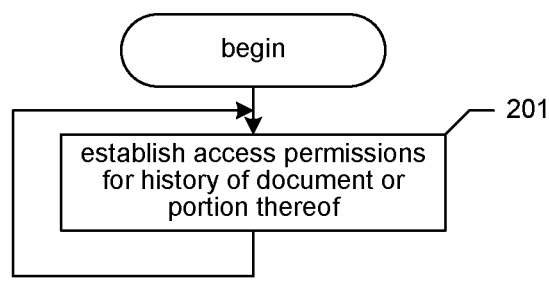
FIG. 2 is a flow diagram showing a process performed by the facility in some embodiments to establish access permissions for document history.
Figure 3:
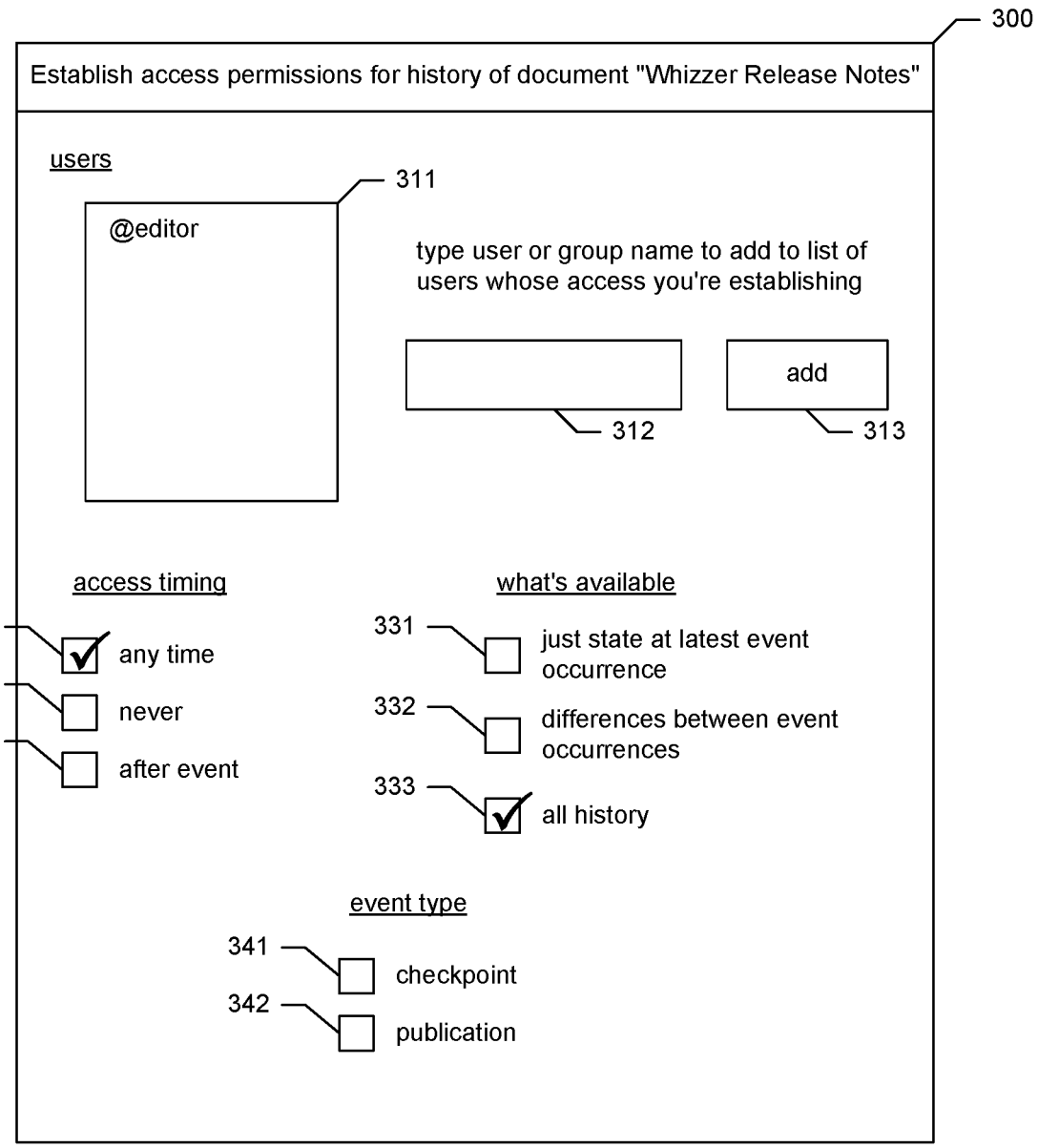
FIG. 3 is a display diagram showing a sample display presented by the facility in some embodiments to solicit access permissions for document history from a user authorized to establish them.

FIG. 2 is a flow diagram showing a process performed by the facility in some embodiments to establish access permissions for document history. In some embodiments, the facility performs this process only for a user who is authorized to establish access permissions for the history of a document or a portion of a document such as a document fragment; users so authorized can include document or document portion creators, authors, owners, etc. In act 201, the facility establishes access permissions for the history of a document or a document portion. In some embodiments, the facility does so by soliciting input from the authorized user establishing these access permissions, and persistently storing them, such as in a document history access permissions table, examples of which are shown in FIGS. 3 and 4 and discussed below. After act 201, the facility continues in act 201 to establish additional access permissions for the document's history.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into sub-acts, or multiple shown acts may be combined into a single act, etc.

FIG. 3 is a display diagram showing a sample display presented by the facility in some embodiments to solicit access permissions for document history from a user authorized to establish them. The display 300 contains controls that the authorized user can use to establish access permissions for a particular document, here the document "Whizzer Release Notes." The display includes a user-to-add field 312 into which the authorized user can enter identifying information for a user or a group of users, then operate an add control 313 to add that user or group of users to a users list 311. This users list is a set of one or more users to whom the history access permissions established by the authorized user will apply. The display further includes access timing controls 321-323; the authorized user selects one of these to specify at what time the selected users can access the document's history. If the authorized user selects control 321, the identified users can access history of the document at any time; if the authorized user selects control 322, then the identified users are never able to access any history of the document; and if the authorized user selects control 323, the identified users can only access history of the document after an event of a particular type has occurred. The authorized user specifies the type of this event using controls 341 and 342; if the authorized user selects control 341, the identified users can only access document history after at least one checkpoint event denoting a certain amount of progress on the document has occurred; if the authorized user selects control 342, the identified users can only access document history after one or more document publication events occur to make the document widely available. In various embodiments, a variety of such event types is available. In various embodiments, occurrence of particular event types is established in a variety of ways, including automatically detecting occurrence of the event, receiving input from the document's author or other authorized person that the event has occurred, etc. The display further includes controls 331, 332, and 333; the authorized user can select one of these three controls in order to specify what forms of document history are available to the identified user. If the authorized user selects control 331, the identified users can access essentially no history—just the state of the document at the time the latest event of the selected event type occurred; if the authorized user selects control 332, then the identified users can access a version of the document's history that shows the state of the document at the time of any event of the type selected by the authorized user that the identified user selects, and/or that identifies differences between pairs of the occurrences of events of the type selected by the authorized user, such as via redlining; and if the authorized user selects control 333, the identified users can access all of the document's history, such as by viewing the state of the document at any point in time, and/or by viewing the differences between the states of the document at two arbitrarily selected times, which need not correspond to the occurrence of any events. FIGS. 6-12 discussed below illustrate the effects of different levels of document history access permissions established for different groups of users.

In some embodiments, the facility stores document history permissions established for a document in a table.

FIG. 4 is a table diagram showing sample contents of a document history access permissions table used by the facility in some embodiments to store document history access permissions established for a document. The document history access permissions table 400 corresponds to a particular sample document, the "Whizzer Release Notes" document for which the establishment of document history access permissions is shown in FIG. 3. In some embodiments (not shown), rather than using a different document history access permissions table for each document as shown, the facility uses one or more document history access permissions tables that contain history access permissions established for different documents. The table is made up of rows, such as rows 401-403, each corresponding to a different set of document history access permissions established for the document. Each row is divided into the following columns: a users column 411 containing information identifying the user or users to which the access permissions to which the row corresponds apply; a timing column 412 containing an indication of when these users can access history of the document; an available column 413 containing an indication of what history information is available to these users; and an event type column 414 containing an indication of the event type to which access timing and available history are connected, if any. Row 401 represents the set of access permissions established in FIG. 3, and specifies that the user or users having an "editor" role with respect to the document can access all of its history at any time. Row 402 indicates that users in the user group "developers" and users in the user group "testers" can, after a checkpoint event occurs, access the differences in state of the document between event occurrences, as well as the state of the document at any checkpoint event. Row 403 indicates that users in the user group "public" can access only the state of the document upon the occurrence of the most recent publication event.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc. As one example, in some embodiments, rather than containing a list of one or more users, user groups, or user roles, users column 411 instead contains an identifier that can be joined to a separate table that contains these users, user groups, or user roles.

Figure 5:
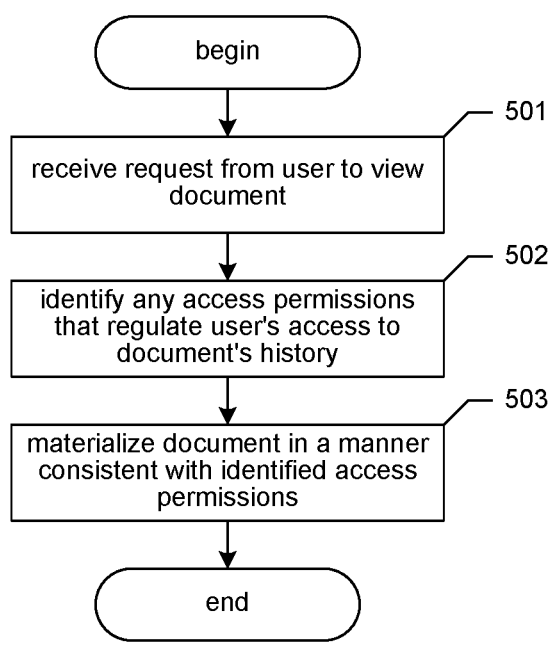
FIG. 5 is a flow diagram showing a process performed by the facility in some embodiments to display history of a document to a user based upon access permissions established for the document's history.

FIG. 5 is a flow diagram showing a process performed by the facility in some embodiments to display history of a document to a user based upon access permissions established for the document's history. In act 501, the facility receives a request from a particular user to view a particular document. In act 502, the facility identifies any access permissions that regulate the user's access to the document's history. These access permissions may affect the user if they (1) explicitly identify the user, (2) identify a group of users of which this user is a member, (3) identify a role currently occupied by this user, etc. In some embodiments, the facility searches the document history access permissions table for the document, or another similar data structure containing document history access permissions for the document. In cases where the facility identifies more than one set of access permissions for the combination of the user and document, the facility uses the terms of an access policy to determine a set of access permissions for the user that is based upon the identified sets of access permissions. In various embodiments, these rules use approaches such as (1) imposing the most restrictive history access permissions among the identified access permission sets; (2) selecting one of the identified access permission sets to impose on the user, such as based upon a precedence among the types of entities for which the access permission sets are specified, such as a precedence in which an individual user comes first, followed by a user role, followed by a user group; in some embodiments, roles inhabited by fewer users are favored over roles having a larger number of users, and groups having a small number of users are favored over groups having a larger number of users. In act 503, the facility materializes the document—that is, generates a viewable version of the document—for the user in a manner that is consistent with the access permissions identified in act 502. Examples of the facility's performance of act 503 are shown in FIGS. 6-12 and discussed below. After act 503, these acts conclude.

Figure 6:
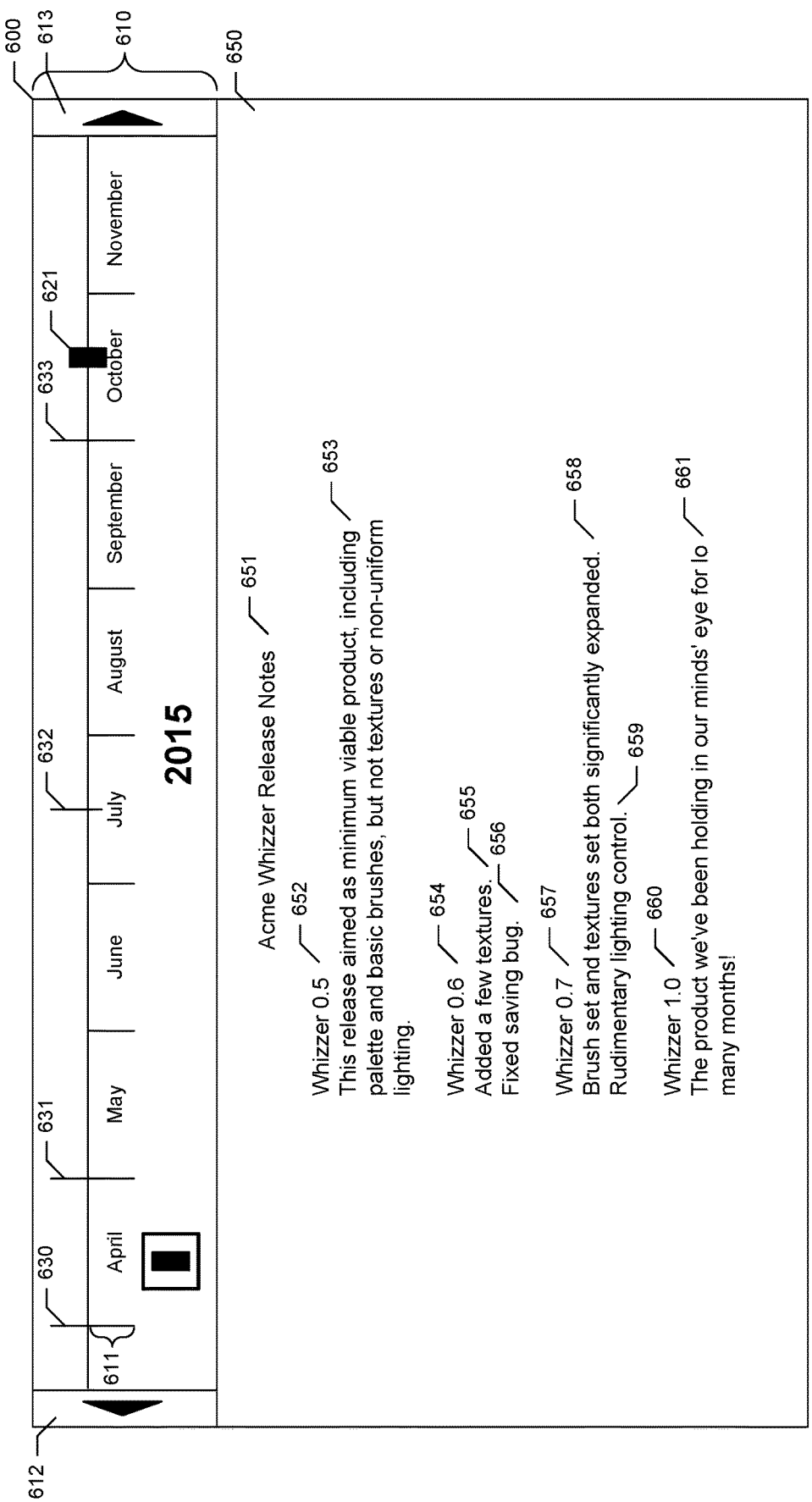
FIG. 6 is a display diagram showing a first sample display presented to a first user by the facility to provide access to document history.

FIG. 6 is a display diagram showing a first sample display presented to a first user by the facility to provide access to document history. The first user is a user having the "editor" role with respect to the document whose document history access permissions are specified by row 401 of the document history access permissions table shown in FIG. 4. This set of history access permissions allows the users subject to it to see all history for the document at any time. The display 600 includes a window 650 containing a materialization of the sample "Whizzer Release Notes" document. The materialization contains paragraphs 651-661. The materialization shows the state of the document on Oct. 18, 2015—this date is indicated by the position of slider 621 on timeline 611. The timeline also shows checkpoint events 630-633. The timeline includes a scroll button 612 that the user can activate to display earlier times on the timeline, and a scroll button 613 that the user can activate to display later times on the timeline. In various embodiments, the facility provides various other techniques for scrolling, selecting, zooming, scoping, etc. the timeline. In some embodiments, the user can navigate through the state of the document on different days and/or at different times by changing the position of slider 621 on the timeline, such as by dragging it.

Figure 7:
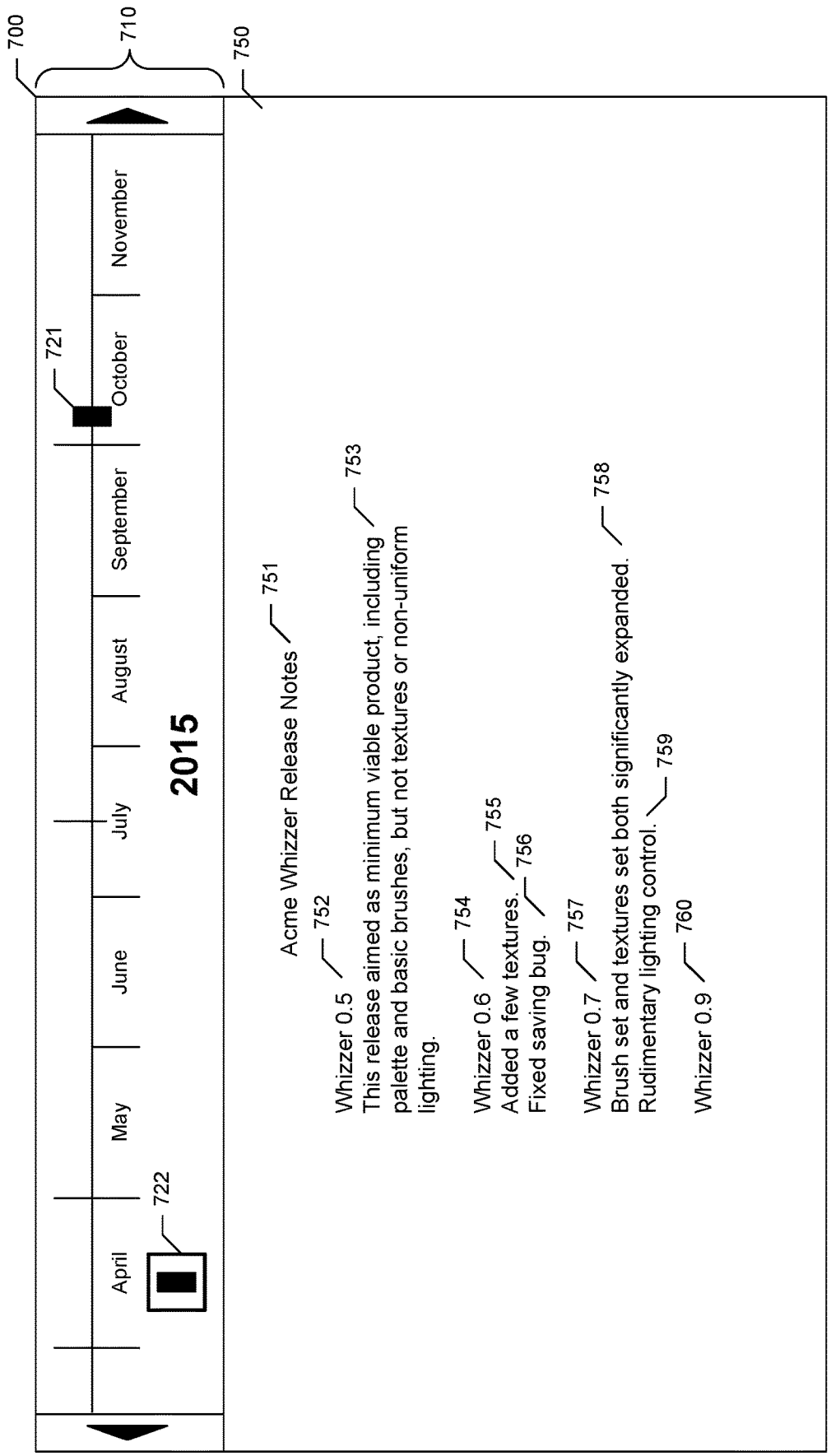
FIG. 7 is a display diagram showing a second sample display presented to a first user by the facility to provide access to document history.

FIG. 7 is a display diagram showing a second sample display presented to a first user by the facility to provide access to document history. It can be seen in display 700 that the slider 721 has been moved from its original October 18th position to a new October 5th position. Accordingly, a rematerialized view 750 of the document now shows the state of the document on this earlier date. It can be seen by comparing FIG. 7 to FIG. 6 that, in the time between October 5th and October 18th, paragraphs 660 and 661 replaced paragraph 760. In some embodiments, the user can specify a range of dates, causing the facility to generate a document materialization that explicitly indicates differences between the state of the document at the beginning of that range of dates and the state of the document at the end, such as via redlining. As one way of specifying such a range, the user can drag additional slider 722 onto the timeline 711 at a point that marks one end of the date range.

Figure 8:
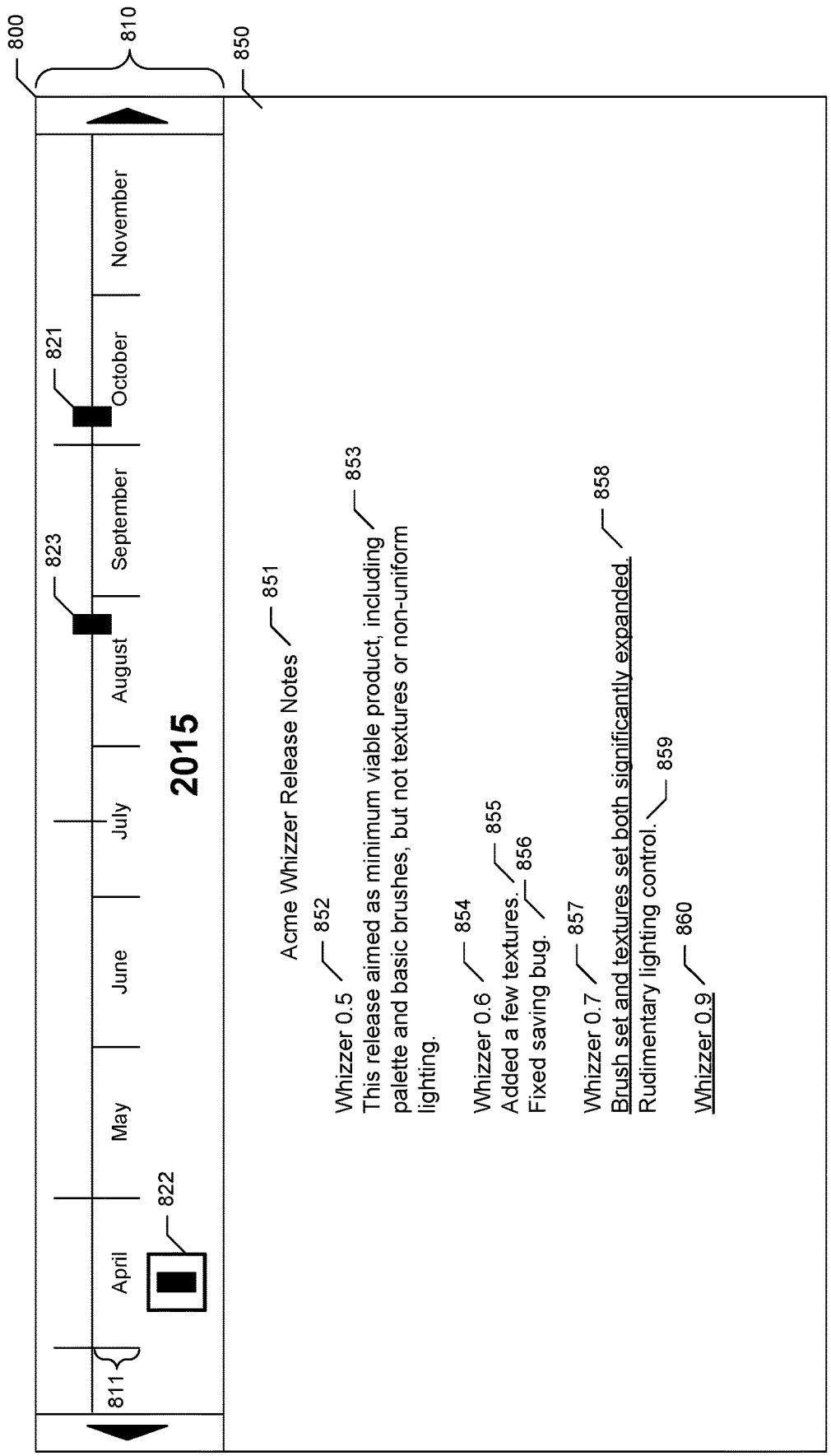
FIG. 8 is a display diagram showing a third sample display presented to a first user by the facility to provide access to document history.

FIG. 8 is a display diagram showing a third sample display presented to a first user by the facility to provide access to document history. It can be seen by comparing FIG. 8 to FIG. 7 that the user has dragged additional slider 822 onto the timeline 811 as slider 823. Together, sliders 823 and 821 define a range from August 28 to October 5. In response to defining this range, the facility has displayed a rematerialization 850 of the document showing changes during that period to paragraphs 858 and 860 via redlining. In particular, during that period, both paragraph 858 and paragraph 860 were inserted into the document.

Figure 9:
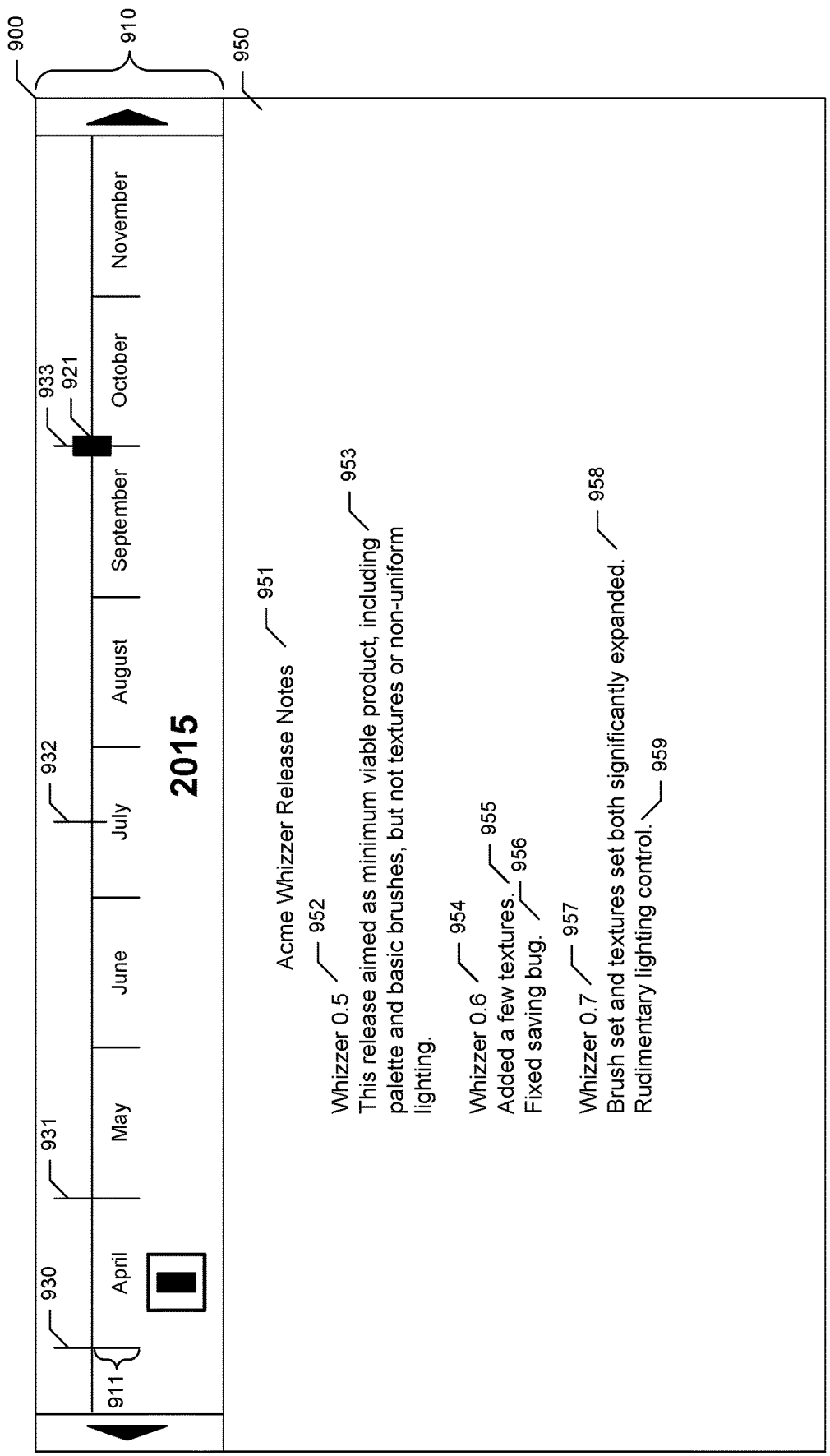
FIG. 9 is a display diagram showing a first sample display presented to a second user by the facility to provide access to document history.

FIG. 9 is a display diagram showing a first sample display presented to a second user by the facility to provide access to document history. The second user is one who is in the "developers" user group, and is therefore subject to the history access permissions specified in row 402 of the document history access permissions table shown in FIG. 4. This set of history access permissions allows the users subject to it to access document history only after a checkpoint event has occurred; these users can only display the state of the document at a checkpoint they select, or the differences between the state of the document at two checkpoints they select. It can be seen from timeline 911 that, among checkpoint events 930-933, checkpoint event 933 is selected by the location of slider 921. Accordingly, materialization 950 of the document reflects the state of the document at the time of checkpoint 933, October 1st. At this point, the user can drag slider 921 to a different checkpoint event to see the state of the document at the newly selected checkpoint event. In some embodiments, the facility prevents the user from dragging the slider 921 to a position on the timeline not corresponding to a checkpoint event. In other embodiments, the user may drag the slider 921 to any position on the timeline, and the facility will materialize the document according to the most recent checkpoint that occurred on or before the associated date. For example, if the user drags the slider to August 1, the facility will display a materialization associated with checkpoint 932, July 15.

Figure 10:
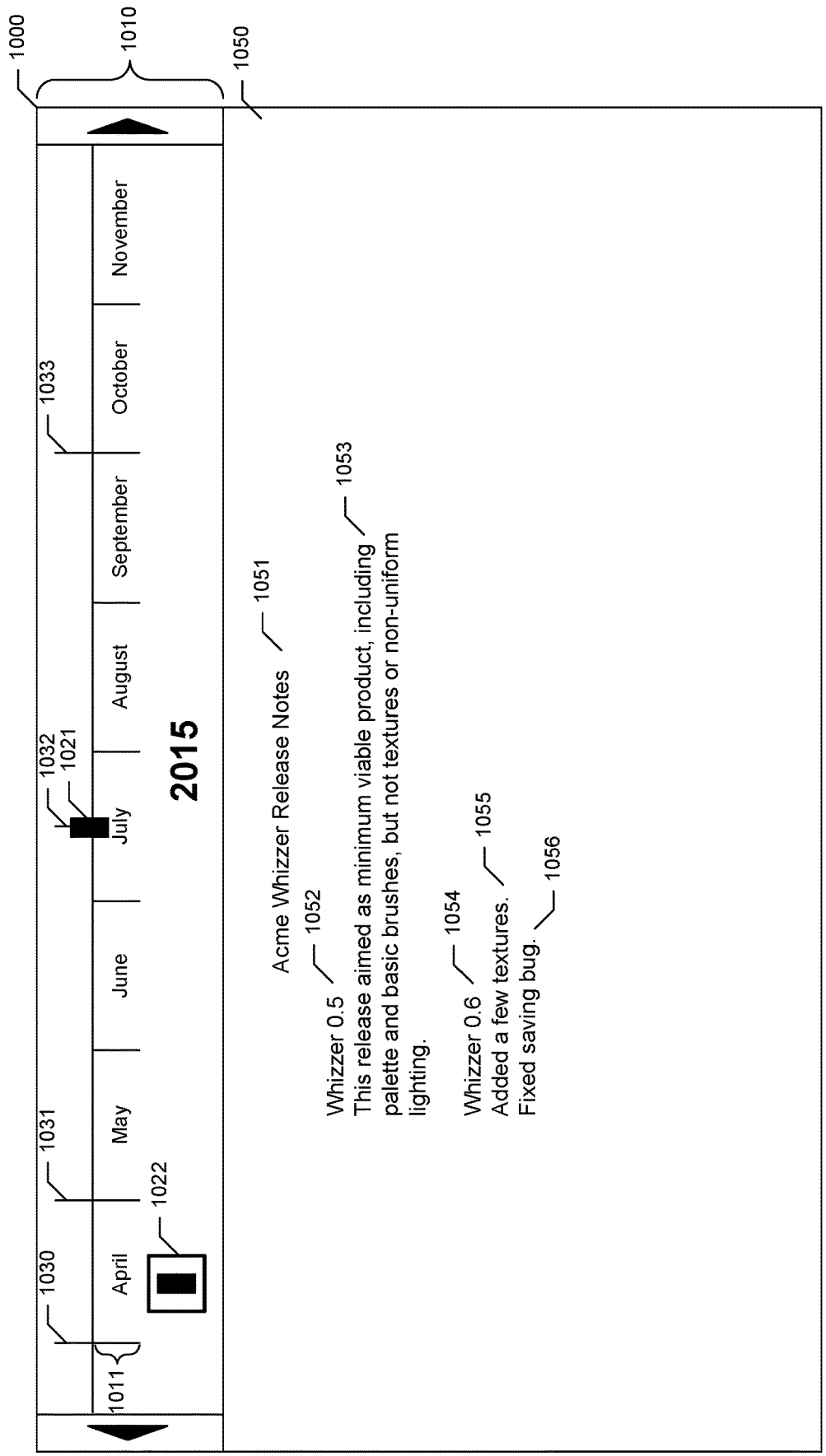
FIG. 10 is a display diagram showing a second sample display presented to a second user by the facility to provide access to document history.

FIG. 10 is a display diagram showing a second sample display presented to a second user by the facility to provide access to document history. It can be seen by timeline 1011 that the user has dragged slider 1021 to checkpoint event 1032. In response, the facility has updated the materialization 1050 of the document to reflect its state at the time of checkpoint event 1032, July 15. It can be seen in materialization 1050 that, at this time, the document did not include paragraphs 957-959 shown in FIG. 9, which were added at a time after July 15. At this point, the user can establish a date range between two checkpoints by dragging additional slider 1022 onto the timeline 1011.

Figure 11:
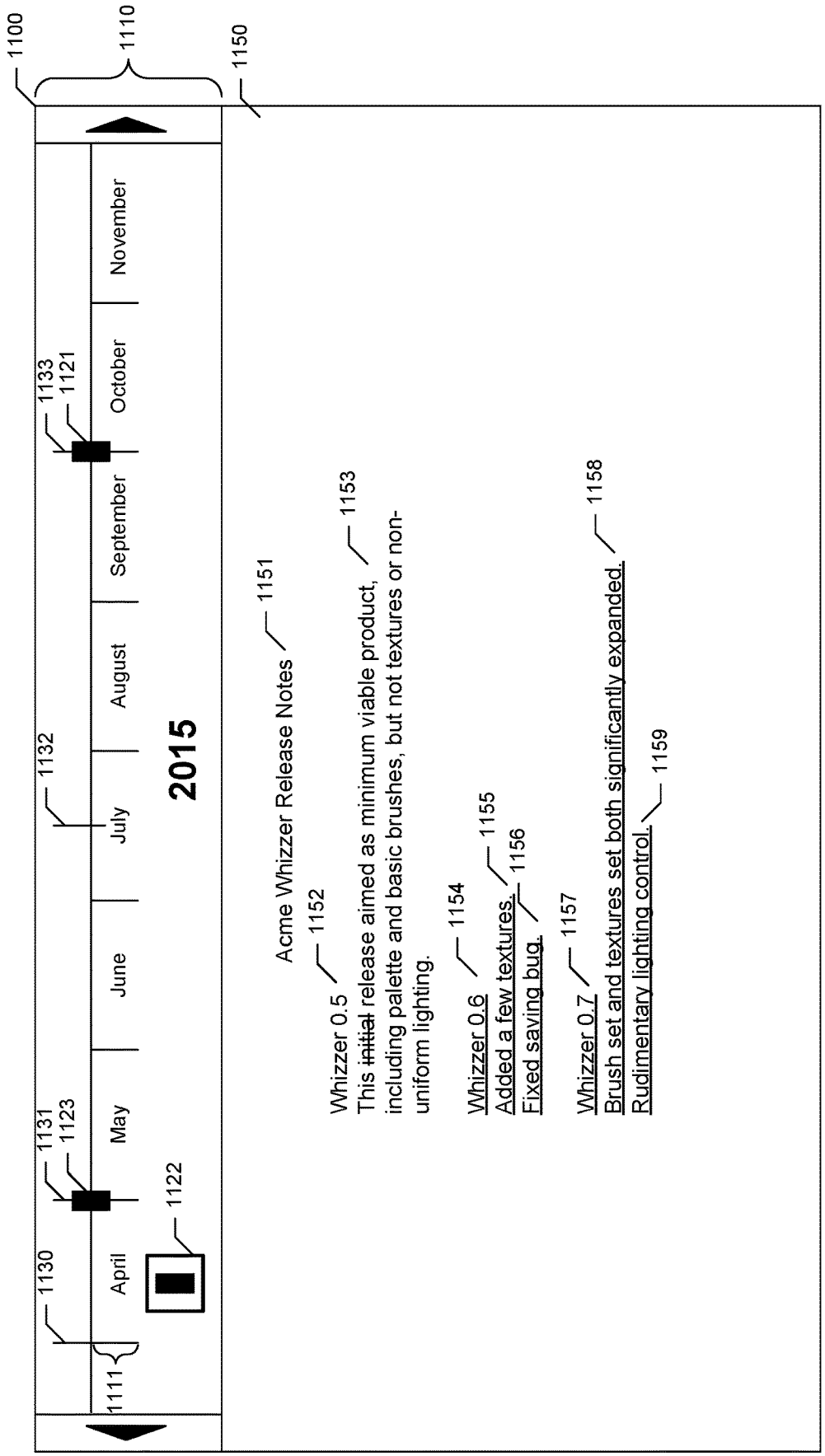
FIG. 11 is a display diagram showing a third sample display presented to a second user by the facility to provide access to document history.

FIG. 11 is a display diagram showing a third sample display presented to a second user by the facility to provide access to document history. It can be seen that the user has dragged additional slider 1122 to checkpoint event 1131 to become slider 1123. Together, sliders 1123 and 1121 define the period between checkpoint events 1131—on May 1—and 1133—on October 1. In response, the facility has updated the materialization 1150 of the document displayed to reflect the changes that occurred between those two checkpoints. It can be seen that, in paragraph 1153, the word "initial" was deleted; and paragraphs 1154-1159 were added.

An additional sample display relates to a third user who is a member of the "public" user group, and is therefore subject to the access permission set specified in row 403 of the document history access permissions table: these users can only display document history after a publication event, and can only display the latest such event. Accordingly, if the third user seeks to display the "Whizzer Release Notes" document at a time before the first publication event occurs, the facility declines to do so, such as by presenting a display similar to display 1100, but with no document materialization 1150, or by displaying a message indicating that the user is not authorized to view the document. At a time after the first publication event occurs for the document, the facility enables the third user to display a materialization of the document.

Figure 12:
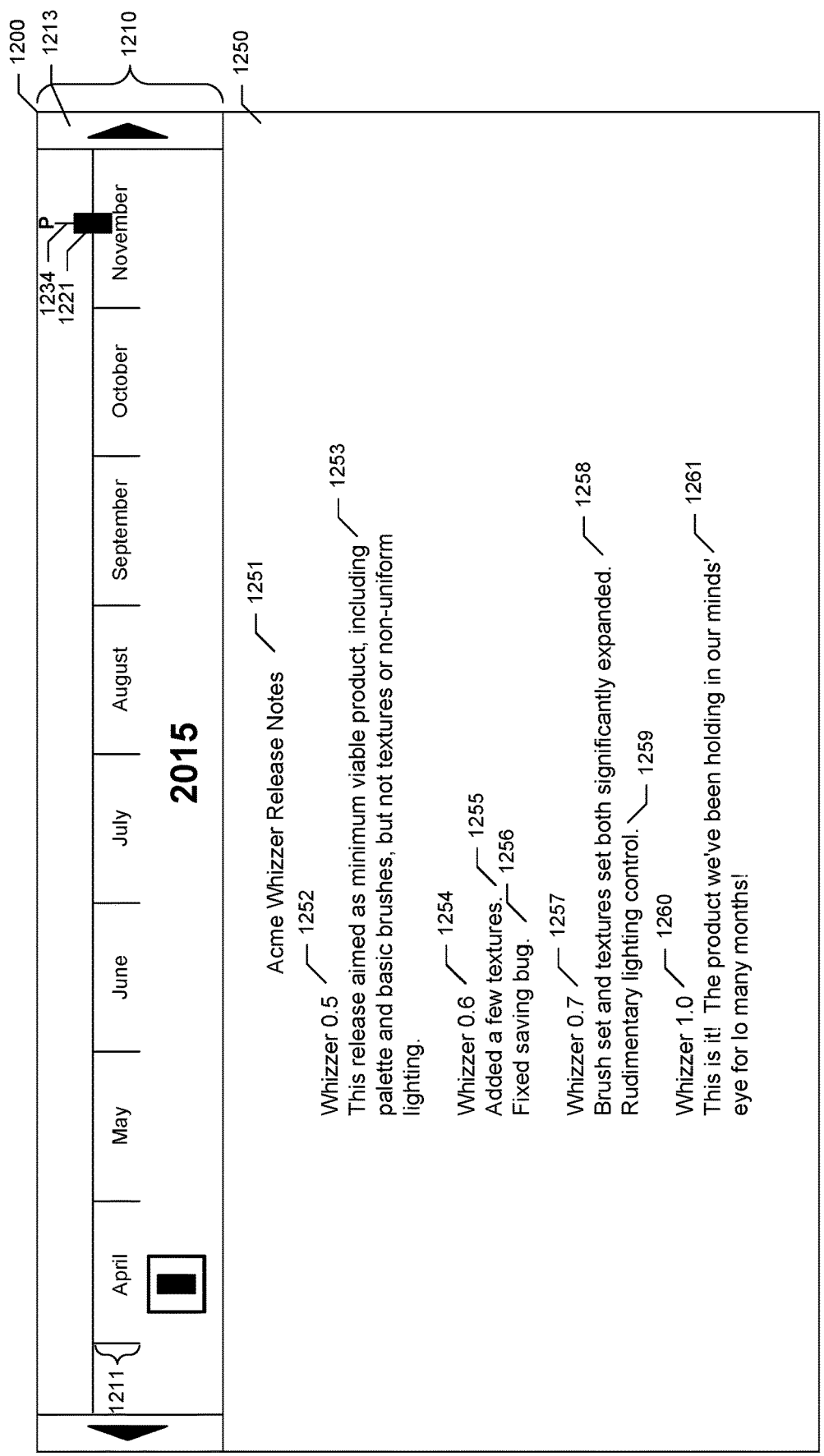
FIG. 12 is a display diagram showing a sample display presented to the third user by the facility to provide access to document history.

FIG. 12 is a display diagram showing a sample display presented to the third user by the facility to provide access to document history. It can be seen that slider 1221 is located at November 16, the date on which the first publication event 1234 occurred. Accordingly, the display includes a document materialization 1250 corresponding to the state of the document when the publication event occurred on that date.

Until a time when a second publication event occurs, the only materialization available to the third user is materialization 1250 shown in FIG. 12. After a time when a second publication event occurs (not shown), the only materialization available to the third user is one that shows the state of the document at the second publication event.

In some embodiments, the facility provides a method in a computing system, comprising: receiving input specifying one or more revisions to a document; causing to be stored a representation of at least a portion of the revisions; receiving a request to materialize the document for a particular entity; and in response to the request, materializing the document in a manner that includes any of the represented revisions only if the entity is among an authorized class of entities.

In some embodiments, the facility provides a computer-readable medium having contents configured to cause a computing system to: receive input specifying one or more revisions to a document; cause to be stored a representation of at least a portion of the revisions; receive a request to materialize the document for a particular entity; and in response to the request, materialize the document in a manner that includes any of the represented revisions only if the entity is among an authorized class of entities.

In some embodiments, the facility provides a computing system comprising: a processor; and one or more memories collectively having contents that, when executed by the processor: receive input specifying one or more revisions to a document; cause to be stored a representation of at least a portion of the revisions; receive a request to materialize the document for a particular entity; and in response to the request, materialize the document in a manner that includes any of the represented revisions only if the entity is among an authorized class of entities.

In some embodiments, the facility provides a computing system comprising: a processor; and one or more memories collectively having contents that, when executed by the processor: (a) receive from an authorized user first input identifying at least a portion of a document; (b) receive from the authorized user second input identifying a group of one or more users; (c) receive from the authorized user third input specifying one or more details regarding how a user among the group of one or more users identified by the second input may access history of the at least a portion of a document identified by the first input; and (d) store for the at least a portion of a document identified by the first input and the group of one or more users identified by the second input a representation of the third input.

In some embodiments, the facility provides a computer-readable medium having contents configured to cause a computing system to: (a) receive from an authorized user first input identifying at least a portion of a document; (b) receive from the authorized user second input identifying a group of one or more users; (c) receive from the authorized user third input specifying one or more details regarding how a user among the group of one or more users identified by the second input may access history of the at least a portion of a document identified by the first input; and (d) store for the at least a portion of a document identified by the first input and the group of one or more users identified by the second input a representation of the third input.

In some embodiments, the facility provides a method in a computing system, comprising: (a) receiving from an authorized user first input identifying at least a portion of a document; (b) receiving from the authorized user second input identifying a group of one or more users; (c) receiving from the authorized user third input specifying one or more details regarding how a user among the group of one or more users identified by the second input may access history of the at least a portion of a document identified by the first input; and (d) storing for the at least a portion of a document identified by the first input and the group of one or more users identified by the second input a representation of the third input.

In some embodiments, the facility provides a computer-readable medium having contents configured to cause a computing system to: receive input from an authorized user identifying a document and an entity not comprising the user; retrieve a set of document history access permissions that apply to the document and entity identified by the received input; materialize the document in a manner that includes its history only to the extent permitted by the retrieved document history access permissions; and cause the materialized document to be displayed to the user.

In some embodiments, the facility provides a computing system comprising: a processor; and one or more memories collectively having contents that, when executed by the processor: receive input from an authorized user identifying a document and an entity not comprising the user; retrieve a set of document history access permissions that apply to the document and entity identified by the received input; materialize the document in a manner that includes its history only to the extent permitted by the retrieved document history access permissions; and cause the materialized document to be displayed to the user.

In some embodiments, the facility provides a method in a computing system, comprising: receiving input from an authorized user identifying a document and an entity not comprising the user; retrieving a set of document history access permissions that apply to the document and entity identified by the received input; materializing the document in a manner that includes its history only to the extent permitted by the retrieved document history access permissions; and causing the materialized document to be displayed to the user.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system, comprising:
   receiving a first request to materialize a portion of a document for a first entity;
   retrieving stored revisions for the document, the stored revisions representing a state of the document at a plurality of points in time in a history of the document;
   determining, based on a first set of access permissions associated with the first entity, a first subset of the plurality of points in time in the history of the document accessible to the first entity;
   in response to the first request, materializing the portion of the document with user-selectable options for displaying the portion of the document as the document existed at the first subset of the plurality of points in time in the history of the document;
   receiving a second request to materialize the portion of the document for a second entity;
   determining, based on a second set of access permissions associated with the second entity, a second subset of the plurality of points in time in the history of the document accessible to the second entity, the second subset of the plurality of points in time in the history of the document accessible to the second entity being different from the first subset of the plurality of points in time in the history of the document accessible to the first entity based on a difference between the first set of access permissions associated with the first entity and the second set of access permissions associated with the second entity; and in response to the second request, materializing the portion of the document with user-selectable options for displaying the portion of the document as the document existed at the second subset of the plurality of points in time in the history of the document.

2. The method of claim 1 wherein the first entity is a user.

3. The method of claim 1 wherein the first entity is a group of users.

4. The method of claim 1 wherein the first entity is a computing system operating on behalf of one or more users.

5. The method of claim 1 wherein the materialization comprises displaying a view of the portion of the document that visually indicates, in a static manner, at least a portion of the revisions.

6. The method of claim 1 wherein the materialization comprises displaying a view of the portion of the document that visually indicates at least a portion of the revisions via redlining.

7. The method of claim 1 wherein the materialization comprises permitting a user corresponding to the first entity to navigate, via the user selectable options, between a pair of states of the portion of the document each corresponding to a different time, between which at least a portion of the revisions occur.

8. The method of claim 1, further comprising causing the materialized portion of the document to be displayed.

9. A computer system comprising:
a processor; and
one or more memories collectively having contents that, when executed by the processor:
(a) receive from an authorized user first input identifying at least a portion of a document;
(b) receive from the authorized user second input identifying a first group of one or more users;
(c) receive from the authorized user third input specifying a first subset of a plurality of points in time in a revision history of the at least a portion of a document accessible to a first user among the first group of one or more users, wherein accessing the revision history includes accessing stored revisions representing a state of the at least a portion of a document as the at least a portion of a document existed at the first subset of the plurality of points in time in the revision history of the at least a portion of a document;
(d) store for the at least a portion of a document identified by the first input and the first group of one or more users identified by the second input a representation of the third input;
(e) receive from the authorized user fourth input identifying a second group of one or more users;
(f) receive from the authorized user fifth input specifying a second subset of a plurality of points in time in a revision history of the at least a portion of a document accessible to a second user among the second group of one or more users, wherein accessing the revision history includes accessing stored revisions representing a state of the at least a portion of a document as the at least a portion of a document existed at the second subset of the plurality of points in time in the revision history of the at least a portion of a document;
(g) store for the at least a portion of a document identified by the first input and the second group of one or more users identified by the fourth input a representation of the fifth input;
(h) in response to receiving a first request from a first requesting user included in the first group of one or more users to access revision history of the at least a portion of a document identified by the first input, materialize the at least a portion of a document with user-selectable options for displaying the at least a portion of the document as the document existed at the first subset of the plurality of points in time in the history of the document based on the stored representation of the third input; and
(i) in response to receiving a second request from a second requesting user included in the second group of one or more users to access revision history of the at least a portion of a document identified by the first input, materialize the at least a portion of a document with user-selectable options for displaying the at least a portion of the document as the document existed at the second subset of the plurality of points in time in the history of the document based on the stored representation of the fifth input, the second subset of the plurality of points in time in the history of the document being different from the first subset of the plurality of points in time in the history of the document based on a difference between access permissions associated with the first group of one or more users and the second group of one or more users.

10. The computing system of claim 9 wherein the received third input specifies whether the first subset of a plurality of points in time in revision history of the at least a portion of a document identified by the first input that can be accessed by users in the first group of one or more users identified by the second input can access is limited to points in time connected to document events occurring for the at least a portion of a document identified by the first input.

11. The computing system of claim 9 wherein the received third input (1) specifies that revision history of the at least a portion of a document identified by the first input that can be accessed by users in the first group of one or more users identified by the second input can access is limited to the first subset of a plurality of points in time in revision history connected to document events occurring for the at least a portion of a document identified by the first input, and (2) specifies a type of document event in connection with which revision history of the at least a portion of a document identified by the first input that can be accessed by users in the first group of one or more users identified by the second input.

12. A non-transitory computer-readable medium having contents configured to cause a computing system to:
receive input from an authorized user identifying a portion of a document and a first entity not comprising the authorized user;
retrieve a first set of document history access permissions that apply to the portion of the document and the first entity identified by the received input;
determine, based on the first set of document history access permissions, a first subset of a plurality of points in time in a history of the portion of the document accessible to the authorized user;
materialize the portion of the document with user-selectable options for displaying the portion of the document as the portion of the document existed at the first subset of the plurality of points in time in the history of the document;

cause the materialized portion of the document to be displayed to the authorized user;

receive input from the authorized user identifying the portion of the document and a second entity not comprising the authorized user;

retrieve a second set of document history access permissions that apply to the portion of the document and the second entity identified by the received input;

determine, based on the second set of document history access permissions, a second subset of a plurality of points in time in the history of the document accessible to the authorized user;

materialize the portion of the document with user-selectable options for displaying the document as the portion of the document existed at the second subset of the plurality of points in time in the history of the portion of the document, the second subset of the plurality of points in time in the history of the document accessible to the second entity being different from the first subset of the plurality of points in time in the history of document accessible to the first entity based on a difference between the first set of document history access permissions associated with the first entity and the second set of document history access permissions associated with the second entity; and cause the materialized portion of the document to be displayed to the authorized user.

13. The non-transitory computer-readable medium of claim 12 wherein the first entity is a user other than the authorized user.

14. The non-transitory computer-readable medium of claim 12 wherein the first entity is a category of users.

15. The non-transitory computer-readable medium of claim 12 wherein the contents are further configured to cause a computing system to receive a user-selectable option that identifies a point in time of the first subset of the plurality of points in time, and display the document as the document existed at the point in time associated with the received user-selectable option.

\* \* \* \* \*